Dec. 12, 1967  R. J. HOLTON  3,357,293

SEALED SELF-THREADING CAP NUT

Filed Sept. 15, 1965

INVENTOR.
ROBERT J. HOLTON
BY
Teare, Teizer & Teare
ATTORNEYS

United States Patent Office 3,357,293
Patented Dec. 12, 1967

3,357,293
SEALED SELF-THREADING CAP NUT
Robert J. Holton, Rocky River, Ohio, assignor to Tinnerman Products, Inc., Cleveland, Ohio, a corporation of Ohio
Filed Sept. 15, 1965, Ser. No. 487,426
5 Claims. (Cl. 85—35)

This invention relates to fastening devices, and more particularly relates to an improved construction for a self-threading nut type fastening device for assembly with threadless studs, bolts, rods or the like.

Heretofore, various types of non-threaded fasteners have been employed for many applications, such as for instance, in the securement to a plain (threadless) member, such as a stud, bolt, rod or the like, for mounting an object on a support member, such as an apertured panel or the like. It has been found, however, that such heretofore known fasteners are subject to a number of disadvantages. Thus in certain installations, it is necessary to exert a high tightening force on such fasteners in order to achieve a tight seal with a panel or the like. Such tightening force generally results in deformation of the fastener and/or shearing of the threads formed on the stud with consequent loosening of the parts, particularly in installations where there exist any rough and/or irregular surfaces on the panel. In many instances, deformation and/or shearing renders the fastener and/or stud unsuitable for repeated usage and makes the securement of an effective seal extremely difficult, if not impossible. In addition, it has been found that as a result of the formation of threads on the stud or the like by such fasteners, that there are frequently produced burrs and/or sharp edges on the stud. Such condition results in snagging of the cleaning cloths, workmen's garments or the like and often inflicts injury to the workmen. Furthermore, in such prior fasteners portions of the stud remain open to the atmosphere and moisture resulting in corrosion which limits the wear life of the installation and which renders detachment of the parts extremely difficult.

Accordingly, it is a principal object of the present invention to provide an improved construction for a self-threading nut type fastening device to overcome the above and other related disadvantages of heretofore known similar type fastening devices.

Another object of the present invention is to provide an inexpensive, simple, yet sturdy fastening device of the character described for self-threading securement onto a plain (threadless) member, such as a stud, bolt, rod or the like, for mounting an object on a support member, such as an apertured panel or the like.

A further object of the present invention is to provide a fastening device of the character described which incorporates a novel resilient sealing means adapted to provide a tight seal and locking engagement between the device and the surface of a support member or the like to which the device may be applied.

Another object of the present invention is to provide a fastening device of the character described wherein the resilient sealing means provides a tight seal and/or insulation between the device and a threadless member, such as a stud, bolt, rod or the like, to which the device may be applied.

A still further object of the present invention is to provide a fastening device of the character described which may be quickly and easily assembled into self-threading engagement with a threadless stud or the like, which prevents deformation of the device and/or shearing of the threads formed on the stud, which prevents loosening of the parts, and which effectively provides a protective cover for the stud to prevent snagging or injury from use of the device.

Other objects and advantages of the invention will be apparent from the following description taken in conjunction with the accompanying drawings, wherein.

Figure 1:
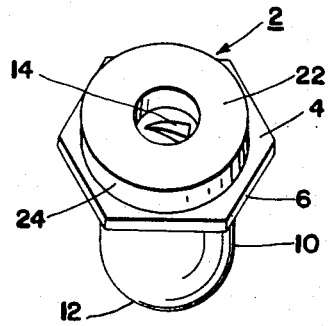
FIG. 1 is a generally perspective view of the improved fastening device made in accordance with the present invention.
Figure 4:
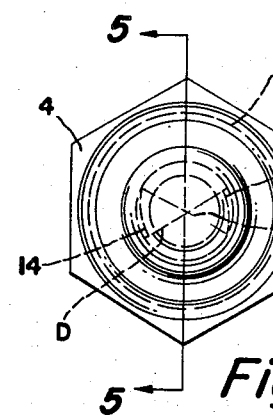
FIG. 4 is an enlarged top plan view of the fastening device shown in FIG. 1.
Figure 5:
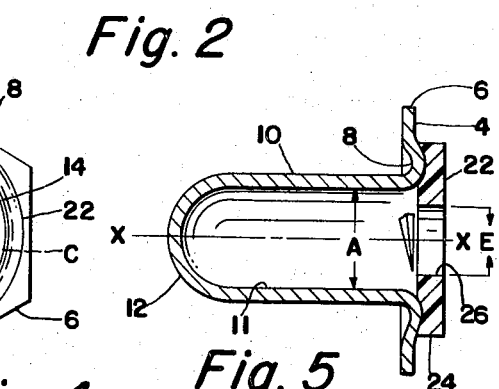
FIG. 5 is a vertical sectional view taken along the plane of the line 5—5 of FIG. 4.
Figure 7:
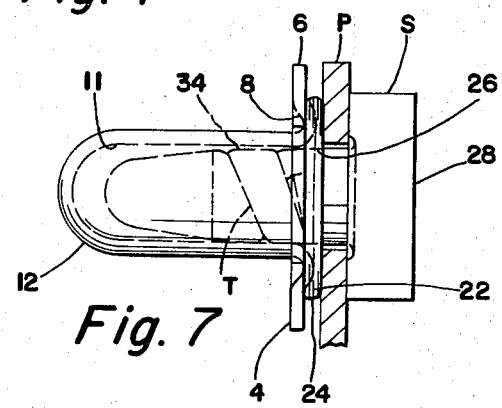
FIG. 7 is a side elevation view, partly in section, of the fastening device of the present invention assembled in self-threading engagement onto the end of a stud of the type shown in FIG. 6.

Referring again to the drawings, and in particular to FIGS. 1, 4 and 5 thereof, the fastening device, designated generally at 2, in one form of the invention may be made from a single blank or strip of material, such as spring steel or similar material having spring-like characteristics, for economic, quantity mass production. As shown, the device 2 includes a base or flange 4 which may have a polygonal, such as hexagonal, outer peripheral edge surface 6 adapted for turning engagement by a suitable tool, such as a wrench or the like, for turning the device into self-threading relationship on the end of a plain (threadless) stud S or the like, as shown in FIG. 7. The base 4, in the embodiment shown, may be provided with an annular embossment 8 spaced inwardly from the peripheral edge surface 6, as shown in FIG. 4. The embossment 8 is preferably of a curved, such as concavo-convex shape in cross-section, (FIG. 5) so as to provide with the base 4 an increased bearing area for retaining a resilient sealing means thereon, as will hereinafter be more fully described.

The embossment 8 is preferably spaced radially inwardly from the peripheral edge surface 6 to enable the latter to be engaged by a suitable tool, as aforesaid. The embossment 8, due to the work hardening in formation thereof, provides a rigid reinforcement to resist deformation of the base 4 upon tightening of the device relative to a support member.

In accordance with the invention, a tube-like shank 10 extends integrally from the base 4 and coaxially relative to the rotational central axis X—X (FIG. 5) of the device. The shank 10 is open at the end adjacent the base 4 so as to provide a passageway 11 for receiving therethrough the aforementioned stud S. The other end of the shank 10 is preferably closed by a continuous, generally semi-circular nose portion 12 which provides, in effect, a complete protective cover for the stud S in its self-threaded position within the shank 10. The shank 10 preferably has a cylindrical internal and external configuration with the inside diameter A of the shank 10 (FIG. 5) being preferably slightly greater than the maximum transverse dimension B (FIG. 6) of the stud S so as to easily accommodate the latter therein during self-threading installation thereof.

Figure 2:
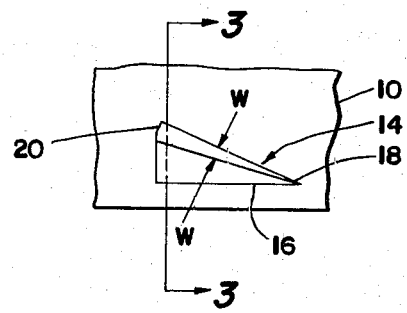
FIG. 2 is an enlarged fragmentary view illustrating the self-threading construction of the fastening device made in accordance with the present invention.
Figure 3:
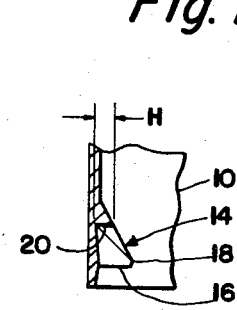
FIG. 3 is a fragmentary vertical sectional view on an enlarged scale taken along the plane indicated by the line 3—3 of FIG. 2.

The shank 10, in the embodiment shown, is preferably provided with a plurality of self-threading means in the form of generally arcuate projections 14. The projections 14 are preferably oppositely disposed and circumferentially spaced on the internal cylindrical surface of the shank 10 and generally radially of the rotational central axis X—X of the device. As shown in FIGS. 2 and 3, the projections 14 are preferably formed by shaving or displacing the material of the internal surface of the shank 10, as indicated at 16, by means of a suitable form tool or the like. This deformation of the shank acts to progressively work-harden the material which provides in the projections 14 a substantially increased hardness relative to the material of the shank itself, thereby to provide a maximum thread-cutting engagement with the threadless surface of the afore-mention stud S.

The construction of the projections 14 is best illustrated in FIGS. 2 and 3 wherein each of the respective projections commences at a leading end 18 and extends circumferentially, but angularly upwardly toward a trailing end 20. Axially considered, each projection preferably increases in thickness or width W—W from the leading end 18 to the trailing end 20. Hence, radially considered, each projection progressively increases in depth or height H—H from the leading end 18, which end is disposed preferably substantially in the general plane of the internal surface of the shank 10, to the trailing end 20 so that the transverse dimension C between opposed projections 14 at the leading ends 18 thereof is slightly greater than the transverse dimension B of the stud S to which it may be applied; but with such transverse dimension being progressively diminished toward the opposed trailing ends 20 so that at the trailing ends, the transverse dimension D therebetween is slightly less than the transverse dimension B of the stud. By this axial and radial construction, there is provided in the projections 14 optimum strength characteristics from a nominal amount at the leading ends 18 to a maximum amount at the trailing ends 20, whereby the projections readily function to displace metal, thereby cutting uniform, helical, double-threads T (FIG. 7) in the outer surface of the stud S with a minimum of torque and/or expansive pressure exerted on the shank 10 of the device during assembly thereof.

In accordance with the present invention, a sealing means in the form of a yieldable pad 22 may be permanently secured to one side of the base 4 and over the outer convex surface (FIG. 5) presented by the embossment 8. The pad 22 is preferably of a relatively thin construction having a peripherally continuous circular edge surface 24. The pad 22, however, may be of any suitable polygonal and/or irregular shape, as desired. The pad 22 has a central opening 26 disposed in axial alignment with the rotational central axis X—X of the shank 10 so as to receive the plain (threadless) stud S therethrough. The opening 26 is preferably circular in shape having a diameter E which is substantially smaller than the maximum transverse dimension B (diameter) of the stud S so as to provide a tight seal therewith in the assembled position thereof. It can be seen that because the Stud S is of a plain or threadless construction its diameter may be substantially greater than the diameter of the opening 26 provided in the pad 22 so as to provide optimum sealing characteristics without tearing or damage to the pad. By this construction, there is provided a substantially air and/or moisture tight sealing engagement with the stud S so as to prevent any corrosion thereof in the assembled position of the device.

The pad 22 is preferably made from a flexible polymeric or elastomeric material. Among such materials which are satisfactory for this purpose are urethane foams, vinyl foams, natural or synthetic rubber foams having good flexibility, tear resistance, and shock absorbent characteristics. The material of the pad 22 may be permanently secured to the base 4 of the device by means of suitable adhesives or by suitable molding techniques as are known in the art.

Figure 6:
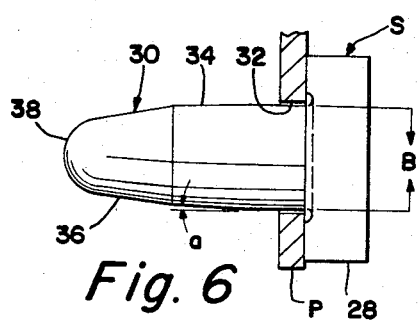
FIG. 6 is an enlarged fragmentary side elevation view, partly in section, showing a threadless stud inserted through a support member, such as a panel, of the type to which the fastening device of the present invention may be applied.

As best seen in FIG. 6, the stud S to which the fastening device 2 may be applied may include a head-like member 28, such as a name plate or the like, which is adapted to be mounted on a support member P, such as a panel or the like. A shank 30 extends integrally from the head-like member 28 and is adapted to be inserted through an aperture 32 provided in the support member P. The shank 30 is preferably of a solid, cylindrical construction having a self-threading portion 34 which may be tapered axially in a direction away from the head-like member 28 to facilitate self-threading engagement with the projections 14 provided on the fastening device 2. Preferably, the included angle (a) defined between the longitudinal central axis of the shank 30 and the tapered peripheral surface of the self-thread forming portion 34 is in the range from about 0° to 1°. In the embodiment shown, a generally frustoconical nose portion 36 having a continuous, rounded end portion 38 extends integrally from the tapered self-thread forming portion 34 and which is adapted to coact therewith to facilitate insertion of the stud S through the aperture 32 provided in the support member P.

In FIG. 7, there is illustrated a typical application of the fastening device 2 for mounting the stud S on the support member P. In assembly, the stud S may be simply inserted through the aperture 32 in the support member P until the head-like member 28 is seated against the confronting surface of the support member P. Thus installed, the fastening device 2 may then be inserted on to the end of the stud S and turned down by means of a suitable tool (not shown) brought into engagement with the edge surface 6 of the base 4. As the fastening device 2 is turned down the projections 14 progressively cut into the tapered thread-forming portion 34 of the stud S so as to displace material therefrom to form generally helical, double-threads T axially along the length of the tapered thread-forming portion 34. The angular disposition in conjunction with the axial and radial construction of the projections 14 greatly increases the cutting efficiency so as to cut deep and uniform threads in such portion of the stud S. Additionally, such construction substantially increases the strength characteristics from the leading 18 to the trailing 20 ends thereof so as to minimize high expansive pressure on the fastening device which would otherwise result from the displacement of material from the stud. As the stud S is drawn against the support member P, the opening 26 in the yieldable pad 22 is progressively expanded by the tapered self-thread forming portion 34 to provide a tight seal with the shank 30 of the stud S, while the material of the pad 22 surrounding the opening 26 is progressively compressed to provide a tight seal between the base 4 and the confronting surface of the support member P. Such compression of the pad material deforms the outer peripheral edge 24 of the pad into the generally convex shape illustrated in FIG. 7. The annular embossment 8 effectively prevents lateral shifting movement of the pad 22 and greatly enhances the sealing characteristics of the pad 22 between the base 4 of the fastening device and the confronting surface of the support member P. Thus installed, the shank 30 of the stud S is completely enclosed and tightly sealed within the shank 10 of the fastening device, thereby to prevent any corrosive action on the stud and to prevent any accidental contact with sharp edges or burrs that might result from the self-threading installation thereon.

Figures 8, 9:
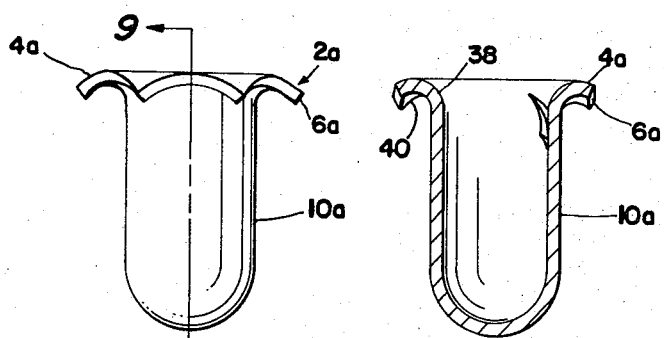
FIG. 8 is a side elevation view of a modification of the fastening device made in accordance with the present invention.
FIG. 9 is a vertical section view taken along the plane of the line 9—9 of FIG. 8.

In FIGS. 8 and 9, there is illustrated a modification of the fastening device 2a which is generally similar to that shown in FIGS. 1 to 7 with the suffix a added to the reference numerals to designate like parts, except that in this form the base 4a which extends radially and integrally from the shank 10a does not include the annular embossment 8. In this form, the base 4a is preferably flared angularly upwardly and outwardly, as at 38, to provide an annular depression therein, thereby to enhance the strength characteristics of the fastening device in that area. The outer peripheral edge surface 6a may similarly be polygonal, such as hexagonal, in shape for turning engagement by a suitable tool. In this form, however, the edge surface 6a is preferably bent downwardly and outwardly, as at 40, to provide a skirt-like construction to facilitate engagement by a tool or the like. Such construction is particularly advantageous for tightening the fastening device when the base 4a is required to be drawn into tight locking engagement against the confronting surface of a support member, such as a panel or the like.

From the foregoing description and accompanying drawings, it will be seen that the present invention provides a novel construction for a fastening device of the self-threading nut type which may be quickly and easily applied for mounting an object, such as a name plate or the like, to a support member. In addition due to its self-threading characteristics, the fastening device of the invention provides an improved construction which completely encloses and which tightly seals the fastening device to a threadless stud or the like, thereby to prevent any corrosive action on the stud and which prevents any snagging which might result from sharp edges or burrs that may otherwise exist on the stud.

The terms and expressions which have been used are terms of description and not of limitation, and there is no invention in the use of such terms and expressions of excluding any equivalents of any of the features described or shown, or portions thereof, but it is recognized that various modifications are possible within the scope of the invention claimed.

I claim:

1. A metal fastening device for rotative application with a threadless stud or the like comprising, a base having a central opening extending therethrough, a tubular shank integrally connected to said base and extending downwardly therefrom, said shank having an endless side wall defining an axial passageway disposed concentric relative to the opening in said base and adapted to receive a stud when inserted through the opening in said base, said shank being entirely closed at the end remote from said base for completely encompassing a stud when disposed in said passageway, a plurality of angularly disposed thread-cutting projections sheared from the material of said side wall and extending interiorly from said side wall into said passageway, said projections being disposed adjacent said base for self-threadcutting engagement with a stud when inserted through the opening in said base, a deformable flexible, substantially flat sealing member attached to the upper surface of said base, an endless raised embossed portion formed from the material of and projecting upwardly from said base, said embossed portion being spaced radially outwardly relative to the opening in said base and adapted to provide a support for said sealing member, said sealing member having a generally circular opening disposed in concentric relation relative to said embossed portion, and the opening in said sealing member having a substantially smaller diameter than the maximum transverse dimension of said stud for tight sealing engagement therewith when inserted for self-threading engagement through the passageway in said shank, and whereby in the installed position of the device with an apertured support member, said sealing member provides the sole surface engagement between said base and the confronting surface of said support member when held together by said stud.

2. A fastening device in accordance with claim 1, wherein said sealing member is comprised of a polymeric foam material.

3. A fastening device in accordance with claim 1, wherein said sealing member is comprised of an elastomeric foam material.

4. A fastening device in accordance with claim 1, wherein said base is of a polygonal shape in top plan providing a plurality of tool-engaging surfaces.

5. A fastening device in accordance with claim 1, wherein said sealing member is attached to the upper surface of said base by means of an adhesive material.

References Cited

UNITED STATES PATENTS

| | | | |
|---|---|---|---|
| 1,957,282 | 5/1934 | Noyack | 85—32 |
| 2,761,349 | 9/1956 | Heller | 85—32 |
| 2,812,527 | 11/1957 | Pavlinetz | 85—35 |
| 2,892,650 | 6/1959 | Runton | 85—1 |
| 2,896,495 | 7/1959 | Crawford | 85—32 |
| 3,006,003 | 10/1961 | Johnson | 85—32 |
| 3,137,196 | 6/1964 | Stawinski | 85—32 |
| 3,150,556 | 9/1964 | Churchill | 85—32 |
| 3,164,055 | 1/1965 | Duffy | 85—32 |
| 3,283,639 | 11/1966 | Holton | 85—32 |

FOREIGN PATENTS

| | | |
|---|---|---|
| 606,603 | 10/1960 | Canada. |
| 241,045 | 10/1925 | Great Britain. |
| 96,984 | 6/1922 | Switzerland. |

CARL W. TOMLIN, *Primary Examiner.*

EDWARD C. ALLEN, *Examiner.*

M. PARSONS, Jr., *Assistant Examiner.*